United States Patent

Wang

[11] Patent Number: 5,734,793
[45] Date of Patent: Mar. 31, 1998

[54] SYSTEM FOR RECOGNIZING SPOKEN SOUNDS FROM CONTINUOUS SPEECH AND METHOD OF USING SAME

[75] Inventor: Shay-Ping T. Wang, Long Grove, Ill.

[73] Assignee: Motorola Inc., Schaumburg, Ill.

[21] Appl. No.: 707,451

[22] Filed: Aug. 29, 1996

Related U.S. Application Data

[63] Continuation of Ser. No. 302,067, Sep. 7, 1994, abandoned.
[51] Int. Cl.⁶ .................................................. G10L 9/00
[52] U.S. Cl. ........................................ 395/2.41; 395/23
[58] Field of Search .................................. 395/2.41, 2.4, 395/23, 24, 25

[56] References Cited

U.S. PATENT DOCUMENTS

| | | | |
|---|---|---|---|
| 3,922,536 | 11/1975 | Hampel et al. | 235/152 |
| 4,624,008 | 11/1986 | Vensko et al. | 395/2.5 |
| 4,718,093 | 1/1988 | Brown | 381/43 |
| 4,761,815 | 8/1988 | Hitchcock | 381/43 |
| 4,852,172 | 7/1989 | Taguchi | 395/2.28 |
| 4,852,180 | 7/1989 | Levinson | 381/43 |
| 5,005,204 | 4/1991 | Deaett | 381/51 |
| 5,042,001 | 8/1991 | Brightman et al. | 364/736 |
| 5,072,452 | 12/1991 | Brown et al. | 381/43 |
| 5,125,022 | 6/1992 | Hunt et al. | 379/88 |
| 5,218,646 | 6/1993 | Sirat et al. | 382/14 |
| 5,276,766 | 1/1994 | Bahl et al. | 395/2.65 |
| 5,299,284 | 3/1994 | Roy | 395/22 |
| 5,329,608 | 7/1994 | Bocchieri et al. | 395/2.52 |
| 5,365,592 | 11/1994 | Horner et al. | 381/46 |
| 5,369,726 | 11/1994 | Kroeker et al. | 395/2.45 |
| 5,404,422 | 4/1995 | Sakamoto et al. | 395/2.41 |
| 5,408,588 | 4/1995 | Ulug | 395/23 |
| 5,450,522 | 9/1995 | Hermansky et al. | 395/2.2 |
| 5,509,106 | 4/1996 | Wang | 395/2.41 |
| 5,594,834 | 1/1997 | Wang | 395/2.62 |

OTHER PUBLICATIONS

Vectorcardiographic Diagnosis Using the Polynomial Discriminant Method of Pattern Recognition, Donald F. Specht, IEEE Transactions on Bio-Medical Engineering, vol. BME-14, No. 2, Apr. 1967, pp. 90-95.

Generation of Polynomial Discriminant Functions for Pattern Recognition, Donald F. Specht, IEEE Transactions on Electronic Computers, vol. EC-16, No. 3, Jun. 1967, pp. 308-319.

Polynomial Theory of Complex Systems, A. G. Ivakhnenko, IEEE Transactions on Systems, Man, and Cybernetics, vol. SMC-1, No. 4, Oct. 1971, pp. 364-378.

Pattern Recognition: Statistical, Structural and Neural Approaches, Robert J. Schalkoff, Clemson University, Copyright 1992, by John Wiley & Sons, Inc., pp. 340-342.

Pattern Recognition Engineering, Morton Nadler, Chief Scientist, Image Processing Technologies; Eric P. Smith Professor of Statistics, Virginia Polytechnic Institute and State University, Copyright 1993 by John Wiley & Sons, Inc. pp. 294-319 & 372-377.

Fundamentals of Speech Recognition, Lawrence Rabiner, Biing-Hwang Juang, Copyright 1993 by AT&T. Published by PTR Prentice-Hall, Inc. pp. 122-132.

(List continued on next page.)

Primary Examiner—Allen R. MacDonald
Assistant Examiner—Susan Wieland
Attorney, Agent, or Firm—Michael Lindsey

[57] ABSTRACT

A system for recognizing spoken sounds from continuous speech includes a plurality of classifiers and a selector. Each of the classifiers implements a discriminant function which is based on a polynomial expansion. By determining the polynomial coefficients of a discriminant function, the corresponding classifier is tuned to classify a specific spoken sound. The selector utilizes the classifier outputs to identify the spoken sounds. A method of using the system is also provided.

22 Claims, 2 Drawing Sheets

OTHER PUBLICATIONS

A Polynomial Time Algorithm for Generating Neural Networks for Classification Problems, Asim Roy and Somnath Mukhopadhyay, Dept. of Decision and Information Systems, Arizona State University, Tempe, AZ 85287, IJCNN, 1992, pp. I–147 thru I–152.

A Neural Feed–Forward Network with a Polynomial Nonlinearity, Nils Hoffmann, Electronics Institite, Building 349, Technical University of Denmark, DK–2800 Lyngby, Denmark, Neural Networks for Signal Processing: Proceedings for the IEEE–SP Workshop, 31 Aug.–2 Sep. 1992, pp. 50–58.

Polynomial and Standard Higher Order Neural Network, Chir–Ho Chang, Jin–Ling Lin, and J.Y. Cheung, Electrical Engineering and Computer Science, University of Oklahoma, 1993 IEEE International Conference on Neural Networks, Mar. 28–Apr. 1, 1993, pp. 989–994.

An Artificial Neural Networks for Approximating Polynomial Functions, Behnam Malakooti and YingQing Zhou, Department of Ssytems Engineering, Center for Automation and Intelligent Systmes Research, Case Western Reserve University, Cleveland, Ohio International Joint Conference on Neural Networks, Jun. 1992, pp. III–966–III–971.

Modeling systems with Polynomial Networks, Tools for Predicting Behavior, Peter D. Varhol, Programmer's Workbench, Dr. Dobb's Journal, Sep. 1993, Begins on p. 76.

Robot Kinematics Learning Computations Using Polynomial Neural Networks, C.L. Philip Chen and A.D. McAulay, Department of Computer Science and Engineering, Wright State University, Dayton, OH 45435, Proceedings of the 1991 IEEE, International Cof. on Robotics and Automation, Sacramento, CA, Apr. 1991, pp. 2638–2643.

Polynomial Functions Can Be Realized by Finite Size Multilayer Feedforward Neural Networks, Naohiro TODA, Ken–ichi Funahashi and Shiro USUI, Department of Information and Computer Sciences, Toyohashi University of Technology, Tempaku, Toyohashi 441, Japan, 1991 IEEE Joint Conference on Neural Networks, vol. 1 of 3, The Westin Stamford and Westin Plaza, 18–21, Nov. 1991, Singapore.

Highly–automated, Non–parametric statistical learning for autonomous target recognition, Keith C. Drake, AbTech Corporation, 700 Harris Street, Charlottesville, Virginia 22903, pp. 1–10, Proceedings of the SPI 20th Applied Imagery Pattern Recognition Workshop, Oct. 1991, McLean, Virginia.

Output Weight Optimization for the Multi_Layer Perceptron, M.T. Manry et al, Conf. Record of the 26th Asilomav Conf. on Signals, Systems, and Computers, 26–28 Oct. 1992, pp. 502–506.

AIM Outperforms Neural Networks and Regression, Mark Shewhart, USAF (IEEE Spectrum), AbTech Corporation, Charlotteville, VA 22903.

Speech Recognition by Computer, Stephen E. Levinson and Mark Y. Liberman, Scientific American. Apr. 1981, vol. 244, No. 4, pp. 64–76.

On the Use of Bandpass Liftering in Speech Recognition, Biing–Hwang Juang, Lawrence R. Rabiner, & Jay G. Wilpon, IEEE Transactions on Acoustics, Speech, and Signal Processing, vol. ASSP–35, No. 7, Jul. 1987.

Speech Coding and Recognition: A Review, Andreas S. Spanias and Frank H. Wu, Paper: Special Section on Fundamentals of Next Generation Human Interface, IEICE Trans. Fundamentals. vol. E75–A. No. 2 Feb. 1992, pp. 132–148.

Generalizatin and Learning in Volterra and Radial Basis Function Networks: A Theoretical Analysis, Sean B. Holden and Peter J. W. Rayner, Cambridge University Engineering Department, Trumpington Street, Cambridge CB2 1PZ, U.K., 0–7803–0532–9/92, 1992 IEEE, pp. II–273–II–276.

SYSTEM FOR RECOGNIZING SPOKEN SOUNDS FROM CONTINUOUS SPEECH AND METHOD OF USING SAME

This is a continuation of application Ser. No. 08/302,067, filed Sep. 7, 1994 and now abandoned.

RELATED INVENTIONS

The present invention is related to the following invention which is assigned to the same assignee as the present invention:

(1) "Neural Network and Method of Using Same", having Ser. No. 08/076,601, filed on Jun. 14, 1993.

(2) "Speech-Recognition System Utilizing Neural Networks and Method of Using Same", having Ser. No. 08/254,844, filed on Jun. 6, 1994.

The subject matter of the above-identified related invention is hereby incorporated by reference into the disclosure of this invention.

TECHNICAL FIELD

This invention relates generally to speech recognition systems and, in particular, to a speech recognition system which recognizes continuous speech.

BACKGROUND OF THE INVENTION

For many years, scientists have been trying to find a means to simplify the interface between man and machine. Input devices such as the keyboard, mouse, touch screen, and pen are currently the most commonly used tools for implementing a man/machine interface. However, a simpler and more natural interface between man and machine may be human speech. A device which automatically recognizes speech would provide such an interface.

Applications for an automated speech-recognition device include a database query technique using voice commands, voice input for quality control in a manufacturing process, a voice-dial cellular phone which would allow a driver to focus on the road while dialing, and a voice-operated prosthetic device for the physically disabled.

Unfortunately, automated speech recognition is not a trivial task. One reason is that speech tends to vary considerably from one person to another. For instance, the same word uttered by several persons may sound significantly different due to differences in accent, speaking speed, gender, or age. In addition to speaker variability, co-articulation effects, speaking modes (shout/whisper), and background noise present enormous problems to speech-recognition devices.

Since the late 1960's, various methodologies have been introduced for automated speech recognition. While some methods are based on extended knowledge with corresponding heuristic strategies, others rely on speech databases and learning methodologies. The latter methods include dynamic time-warping (DTW) and hidden-Markov modeling (HMM). Both of these methods, as well as the use of time-delay neural networks (TDNN), are discussed below.

Dynamic time-warping is a technique which uses an optimization principle to minimize the errors between an unknown spoken word and a stored template of a known word. Reported data shows that the DTW technique is very robust and produces good recognition. However, the DTW technique is computationally intensive. Therefore, it is currently impractical to implement the DTW technique for real-world applications.

Instead of directly comparing an unknown spoken word to a template of a known word, the hidden-Markov modeling technique uses stochastic models for known words and compares the probability that the unknown word was generated by each model. When an unknown word is uttered, the HMM technique will check the sequence (or state) of the word, and find the model that provides the best match. The HMM technique has been successfully used in many commercial applications; however, the technique has many drawbacks. These drawbacks include an inability to differentiate acoustically similar words, a susceptibility to noise, and computational intensiveness.

Recently, neural networks have been used for problems that are highly unstructured and otherwise intractable, such as speech recognition. A time-delay neural network is a type of neural network which addresses the temporal effects of speech by adopting limited neuron connections. For limited word recognition, a TDNN shows slightly better results than the HMM method. However, a TDNN suffers from Some serious drawbacks.

First, the training time for a TDNN is very lengthy, on the order of several weeks. Second, the training algorithm for a TDNN often converges to a local minimum, which is not the globally optimum solution.

In summary, the drawbacks of existing known methods of automated speech-recognition (e.g. algorithms requiring impractical amounts of computation, limited tolerance to speaker variability and background noise, excessive training time, etc.) severely limit the acceptance and proliferation of speech-recognition devices in many potential areas of utility. There is thus a significant need for an automated speech-recognition system which provides a high level of accuracy, is immune to background noise, does not require repetitive training or complex computations, and is insensitive to differences in speakers.

SUMMARY OF INVENTION

It is therefore an advantage of the present invention that spoken sounds can be recognized from continuous speech and the recognition rate is insensitive to differences in speakers.

It is a further advantage of the present invention that spoken sounds can be recognized from continuous speech wherein the recognition rate is not adversely affected by background noise.

Another advantage of the present invention is to provide both a speech-recognition method and system, neither of which requires repetitive training.

Yet another advantage of the present invention is to provide both a method and system for continuous speech recognition, either of which operates with a vast reduction in computational complexity.

These and other advantages are achieved in accordance with a preferred embodiment of the invention by providing a method of recognizing a spoken sound from continuously spoken speech. In this method, the continuously spoken speech includes a plurality of spoken sounds. The method is described by the following steps. A speech signal is generated from the continuously spoken speech. Next, the speech signal is processed to form a feature frame by extracting a plurality of features corresponding to the continuously spoken speech at an instant in time. The feature frame is distributed to a plurality of classifiers. In addition, each classifier implements a discriminant function to generate a classifier output signal in response to the feature frame. Finally, the spoken sound corresponding to the instant of time is identified by comparing the classifier output signals from each of the plurality of classifiers.

In another embodiment of the present invention there is provided a system for recognizing spoken sounds from continuously spoken speech. The system includes the following elements. First, a plurality of classifiers. Each of the classifiers receives a feature frame and implements a discriminant function to generate an output in response to the feature frame. The feature frame is derived from the continuously spoken speech. The second element, a selector, is responsive to the output of each of the classifiers. The selector identifies the spoken sound corresponding to an instant in time by comparing the classifier output signals from each of the plurality of classifiers.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It will be understood by one of ordinary skill in the art that the methods of the present invention may be implemented in hardware or software, or any combination thereof, and that the terms, "continuous speech" and "continuously spoken speech" are used interchangeably in this description.

Figure 1:
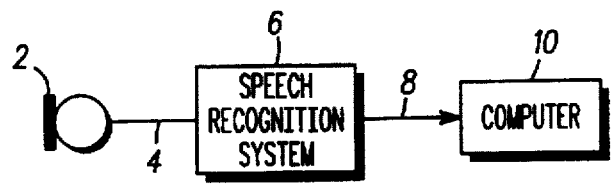
FIG. 1 shows a contextual diagram of a speech-recognition system.

FIG. 1 shows a contextual block diagram of a speech-recognition system. The diagram shows microphone 2 or equivalent means for receiving audio input in the form of speech input and converting sound into electrical energy. Speech recognition system 6 receives signals from microphone 2 over transmission medium 4 and performs various tasks such as waveform sampling, analog-to-digital (A/D) conversion, feature extraction and classification. Speech recognition system 6 provides the identity of spoken sounds to computer 10 via bus 8. Computer 10 executes commands or programs which may utilize the data provided by speech recognition system 6.

One of ordinary skill in the art will understand that speech recognition system 6 may transmit spoken sound identities to devices other than a computer. For example, a communication network, data storage system, or transcription device could be substituted for computer 10.

Figure 2:
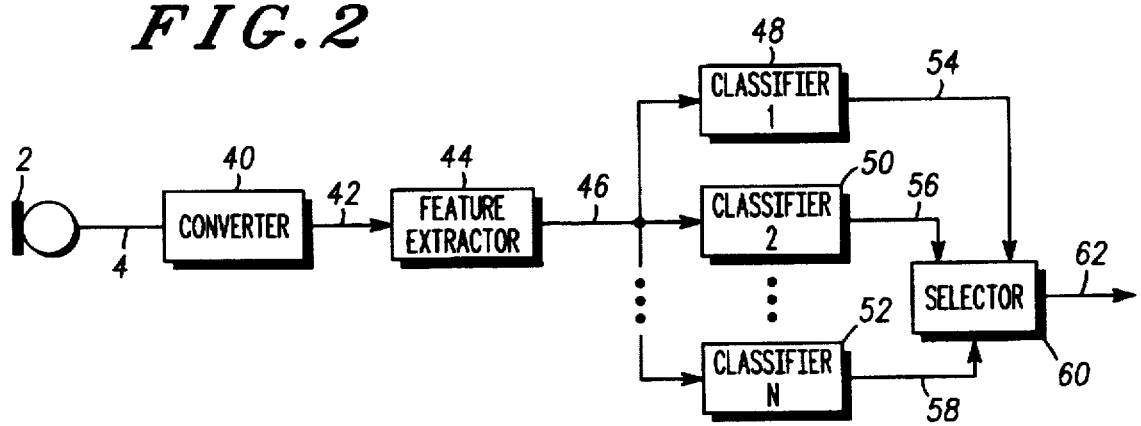
FIG. 2 shows a block diagram of a system for recognizing spoken sounds from continuous speech, in accordance with one embodiment of the present invention.

FIG. 2 shows a block diagram of a system for recognizing spoken sounds from continuous speech, in accordance with one embodiment of the present invention. The system comprises microphone 2, converter 40, feature extractor 44, a plurality of classifiers, and selector 60 which elements, except for microphone 2, comprise speech recognition system 6 (FIG. 2). In the example given by FIG. 2, three classifiers are shown; these are classifiers 48, 50, and 52.

Continuous speech is received by microphone 2 and converted to signals which are transmitted across transmission medium 4 to converter 40. Converter 40 performs various functions which utilize the speech signals. These functions include waveform sampling and analog-to-digital (A/D) conversion. Converter 40 generates as output a speech signal which is passed to feature extractor 44 via bus 42. Feature extractor 44 creates a set of features, or measurements, which contain much of the same information as the speech signal, but with reduced dimensionality. These features are distributed by bus 46 to a plurality of classifiers, of which classifiers 48, 50, and 52 are shown. Generally, each classifier implements a discriminant function which determines whether a set of features belongs to a particular class. The result of computing each discriminant function, referred to as a classifier output signal, is sent to selector 60. In the example given, classifiers 48, 50, and 52 transfer classifier output signals across buses 54, 56, and 58, respectively, to selector 60. Selector 60 compares the classifier output signals with one another, and based on the results of the comparison, selector 60 provides the identity of the spoken sound on output 62.

The operation of the system commences when a user speaks into microphone 2. In a preferred embodiment of the present invention, the system depicted by FIG. 2 is used for recognizing spoken sound from continuously spoken speech. Continuously spoken speech, or continuous speech, takes place when a person speaking into the microphone does not un-naturally pause between each spoken sound. Rather, the person speaking only pauses when the natural form of speech dictates a pause, such as at the end of a sentence. For this reason, continuous speech can be thought of as "natural" speech which occurs in an ordinary conversation. Continuously spoken speech includes at least one spoken sound, wherein a spoken sound may be a word, character, or phoneme. A phoneme is the smallest element of speech sound which indicates a difference in meaning. A character includes one or more phonemes, and a word includes one or more characters.

When a user utters continuous speech, microphone 2 generates a signal which represents the acoustic waveform of the speech. Typically, the signal from microphone 2 is an analog signal. This signal is then fed to converter 40 for digitization. Converter 40 includes appropriate means for A/D conversion as is generally well known to one of ordinary skill in the art. Converter 40 may use an A/D converter (not shown) to sample the signal from microphone 2 several thousand times per second (e.g. between 8000 and 14,000 times per second in a preferred embodiment of the present invention depending on the frequency components of the speech signal from the microphone). Each of the samples is then converted to a digital word, wherein the length of the word is between 12 and 32 bits.

Those of ordinary skill in the art will understand that the sampling rate and word length of A/D converters may vary and that the numbers given above do not place any limitations on the sampling rate or word length of the A/D converter which is included in an embodiment of the present invention.

The speech signal from converter 40 comprises one or more of these digital words, wherein each digital word represents a sample of the continuous speech taken at an instant in time. The speech signal is passed to feature extractor 44 where the digital words, over an interval of time, are grouped into a data frame. In a preferred embodiment of the present invention each data frame represents 10 milliseconds of speech signal. However, one of ordinary skill in the art will recognize that other data frame durations may be used, depending on a number of factors such as the duration of the spoken sounds to be identified. The data frames are in turn subjected to cepstral analysis, a method of feature extraction, which is performed by feature extractor 44.

The cepstral analysis, or feature extraction, which is performed on the speech signal, results in a representation of the speech signal which characterizes the relevant features of the continuous speech over the interval of time. It can be regarded as a data reduction procedure that retains vital characteristics of the speech signal and eliminates undesirable interference from irrelevant characteristics of the speech signal, thus easing the decision-making process of the plurality of classifiers.

The cepstral analysis is performed as follows. First, a p-th order (typically p=12 to 14) linear prediction analysis is applied to a set of digital words from the speech signal to yield p prediction coefficients. The prediction coefficients are then converted into cepstrum coefficients using the following recursion formula:

$$c(n) = a(n) + \sum_{k=1}^{n-1} (1 - k/n) \, a(k) \, c(n - k) \qquad \text{Equation(1)}$$

wherein $c(n)$ represents the $n^{th}$ cepstrum coefficient, $a(n)$ represents the $n^{th}$ prediction coefficient, $1 \leq n \leq p$, p is equal to the number of cepstrum coefficients, n represents an integer index, and k represents an integer index, and $a(k)$ represents the $k^{th}$ prediction coefficient and $c(n-k)$ represents the $(n-k)^{th}$ cepstrum coefficient.

The vector of cepstrum coefficients is usually weighted by a sine window of the form, $$\alpha(n) = 1 + (L/2) \sin(\pi n/L) \qquad \text{Equation (2)}$$

wherein $1 \leq n \leq p$, and L is an integer constant, giving the weighted cepstrum vector, $C(n)$, wherein $$C(n) = c(n) \alpha(n) \qquad \text{Equation (3)}$$

This weighting is commonly referred to as cepstrum liftering. The effect of this liftering process is to smooth the spectral peaks in the spectrum of the speech signal. It has also been found that cepstrum liftering suppresses the existing variations in the high and low cepstrum coefficients, and thus considerably improves the performance of the speech-recognition system.

The result of the cepstral analysis is a smoothed log spectra which corresponds to the frequency components of the speech signal over an interval of time. The significant features of the speech signal are thus preserved in the spectra. Feature extractor 44 generates a respective feature frame which comprises data points from the spectrum generated from a corresponding data frame. The feature frame is then passed or distributed to the plurality of classifiers.

In a preferred embodiment of the present invention, a feature frame contains twelve data points, wherein each of the data points represents the value of cepstrally-smoothed spectrum at a specific frequency over the interval of time. The data points are 32-bit digital words. Those skilled in the art will understand that the present invention places no limits on the number of data points per feature frame or the bit length of the data points; the number of data points contained in a feature frame may be twelve or any other appropriate value, while the data point bit length may be 32 bits, 16 bits, or any other value.

In general, a classifier makes a decision as to which class an input pattern belongs. In a preferred embodiment of the present invention, each class is labeled with a spoken sound, and examples of the spoken sound are obtained from a predefined set of spoken sounds (the training set) and used to determine boundaries between the classes, boundaries which maximize the recognition performance for each class.

Upon receiving a feature frame, each of the classifiers 48, 50, . . . 52 employ a parametric decision method to determine whether a feature frame belongs to a certain class. With this method, each classifier computes a different discriminant function $y_j(X)$, wherein $X=\{x_1, x_2, \ldots, x_i\}$ is the set of data points contained in a feature frame, i is an integer index, and j is an integer index corresponding to the classifier. Upon receiving a feature frame, the classifiers compute their respective discriminant functions and provide the results of their computations as classifier output signals. Generally, the magnitude of a classifier output signal indicates whether a feature frame belongs to the class which corresponds to the discriminant function. In a preferred embodiment of the present invention, the magnitude of a classifier output signal is directly proportional to the likelihood that the feature frame belongs to the corresponding class.

The discriminant functions computed by the classifiers are based upon the use of a polynomial expansion and, in a loose sense, the use of an orthogonal function, such as a sine, cosine, exponential/logarithmic, Fourier transformation, Legendre polynomial, non-linear basis function such as a Volterra function or a radial basis function, or the like, or a combination of polynomial expansion and orthogonal functions.

A preferred embodiment of the present invention employs a polynomial expansion of which the general case is represented by Equation 4 as follows:

$$y = \sum_{i=1}^{m} w_{i-1} x_1^{g_{1i}} x_2^{g_{2i}} \ldots x_n^{g_{ni}} \qquad \text{Equation (4)}$$

where $x_i$ represent the classifier inputs and can be a function such as $x_i = f_i(z_j)$, wherein $z_j$ is any arbitrary variable, and where the indices i, j, and m may be any integers; where y represents the output of the classifier; where $w_{i-1}$ represent the coefficient for the ith term; where $g_{1i}, \ldots, g_{ni}$ represent the exponents for the ith term and are integers; and n is the number of classifier inputs.

In the example shown by FIG. 2, the classifier output signal of classifier 48 is passed to selector 62 across bus 54; the classifier output signal of classifier 50 is passed across bus 56 to selector 60; and classifier output signal of character classifier 52 is passed across bus 58 to selector 60.

Selector 60 determines which of the classifier output signals has the largest magnitude and then produces a representation of the corresponding spoken sound identity on output 62. In one embodiment of the present invention, the representation produced by selector 60 is digital word coded in a computer-readable format. However, one of ordinary skill in the art will appreciate that the representation provided on output 62 may vary in form depending on the application of the system. For example, output 62, as with any of the signals herein described, could be an analog or optical signal.

In one embodiment of the present invention, the system shown in FIG. 2 is implemented by software running on a processor such as a microprocessor. However, one of ordinary skill will recognize that a programmable logic array, ASIC, or other digital logic device could also be used to implement the functions performed by the system shown in FIG. 2.

Figure 3:
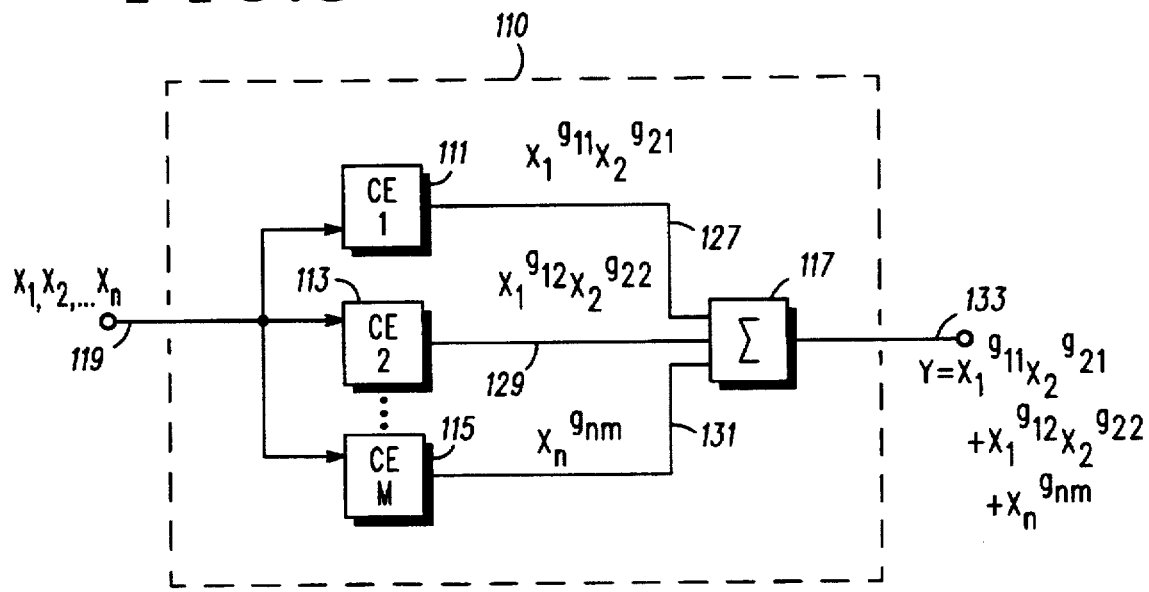
FIG. 3 is a block diagram of a classifier in accordance with a preferred embodiment of the present invention.

FIG. 3 is a block diagram of a classifier which is in accordance with a preferred embodiment of the present invention. Classifier 110 is a possible implementation of one of the plurality of classifiers depicted in FIG. 2. Classifier 110 includes a plurality of computing elements, of which computing element 111, 113, and 115 are shown. Classifier 110 also includes summation circuit 117.

A polynomial expansion is calculated by classifier 110 in the following manner. A plurality of data inputs $x_1, x_2, \ldots, x_n$ are fed into classifier 110 using bus 119 and then distributed to the plurality of computing elements, represented by 111, 113, and 115. Typically, the data inputs would be data points from a feature frame. After computing a term, a computing element passes the term to summing circuit 117 which sums the terms computed by the computing elements and places the sum on output 133.

For example, FIG. 3 depicts the computation of the polynomial $y = x_1^{g_{11}} x_2^{g_{21}} + x_1^{g_{12}} x_2^{g_{22}} + \ldots x_n^{g_{nm}}$. Computing element 111 computes the term $x_1^{g_{11}} x_2^{g_{21}}$ and then sends it to summing circuit 117 over bus 127; computing element 113 computes the term $x_1^{g_{12}} x_2^{g_{22}}$ and then sends it to summing circuit 117 over bus 129; and computing element 115 computes the term $x_n^{g_{nm}}$ and then sends it to summing circuit 117 over bus 131. Upon receiving the terms from the computing elements, summing circuit 117 sums the terms and places the result of the polynomial expansion, y, on output 133.

It will be apparent to one of ordinary skill that classifier 110 is capable of computing polynomials of the form given by Equation 4 which have a number of terms different from the above example, and polynomials whose terms are composed of data inputs different from those of the above example.

In one embodiment of the present invention, classifier 110 is implemented by software running on a processor such as a microprocessor. However, one of ordinary skill in the art will recognize that a programmable logic array, ASIC or other digital logic device could also be used to implement the functions performed by the classifier 110.

Figure 4:
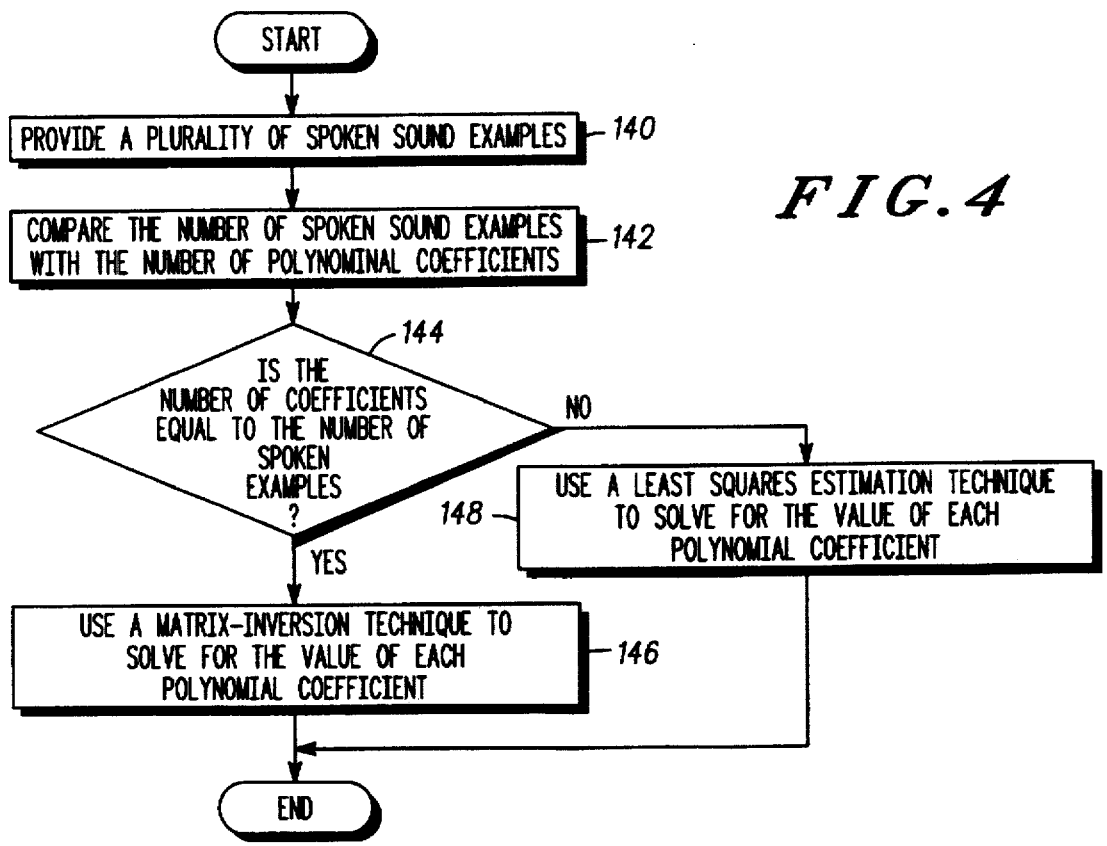
FIG. 4 shows a flow diagram of a method of training a speech-recognition system to identify spoken sounds from continuous speech in accordance with the present invention.

FIG. 4 shows a flow diagram of a method of training a speech-recognition system to identify spoken sounds from continuous speech. A speech-recognition system constructed in accordance with an embodiment of present invention has principally two modes of operation: (1) a training mode in which examples of spoken sounds are used to train the plurality of classifiers, and (2) a recognition mode in which spoken sounds in continuous speech are identified. Referring to FIG. 2, generally, a user must train the plurality of classifiers by providing examples of all of the spoken sounds that the system is to recognize.

In an embodiment of the present invention, a classifier may be trained by tuning the coefficients of a discriminant function which is based on a polynomial expansion of the form given by Equation 4. For the discriminant function to effectively classify input data, the coefficient, $w_{i-1}$, of each term in the polynomial expansion must be determined. This can be accomplished by the use of the following training method.

In box 140, a plurality of spoken sound examples is provided. A spoken sound example comprises two components. The first component is a set of classifier inputs derived from the spoken sound, and the second component is a corresponding desired classifier output signal.

Next, in box 142, the trainer compares the number of spoken sound examples with the number of polynomial coefficients in the discriminate function.

In decision box 144, a check is made to determine whether the number of polynomial terms is equal to the number of spoken sound examples. If so, the spoken sound examples can be represented as a square-matrix and the method proceeds to box 146. If not, the method proceeds to box 148.

In box 146, a matrix inversion technique is used to solve for the value of each polynomial coefficient. Using matrix inversion, the discriminant transfer function can be represented by the matrix equation Y=WZ, where Y represents a matrix of example classifier output signals, W represents a matrix of coefficients, and Z is a matrix of signals representing functions of the example classifier inputs, such as exponential functions. The coefficient matrix is determined according to the equation $W = Z^{-1}Y$, where $Z^{-1}$ represents the inverse matrix of Z.

In box 148, a least squares estimation technique is used to solve for the value of each polynomial coefficient. Essentially, a polynomial discriminant function is fitted to the set of spoken sound examples using a suitable least-squares estimation technique such as for example, least-squares, extended least-squares, pseudo-inverse, Kalman filter, maximum-likelihood algorithm, Bayesian estimation, and the like.

In implementing a classifier which is usable in an embodiment of the present invention, one generally selects the number of computing elements in the classifier to be equal to or less than the number of examples presented to the learning machine.

Figure 5:
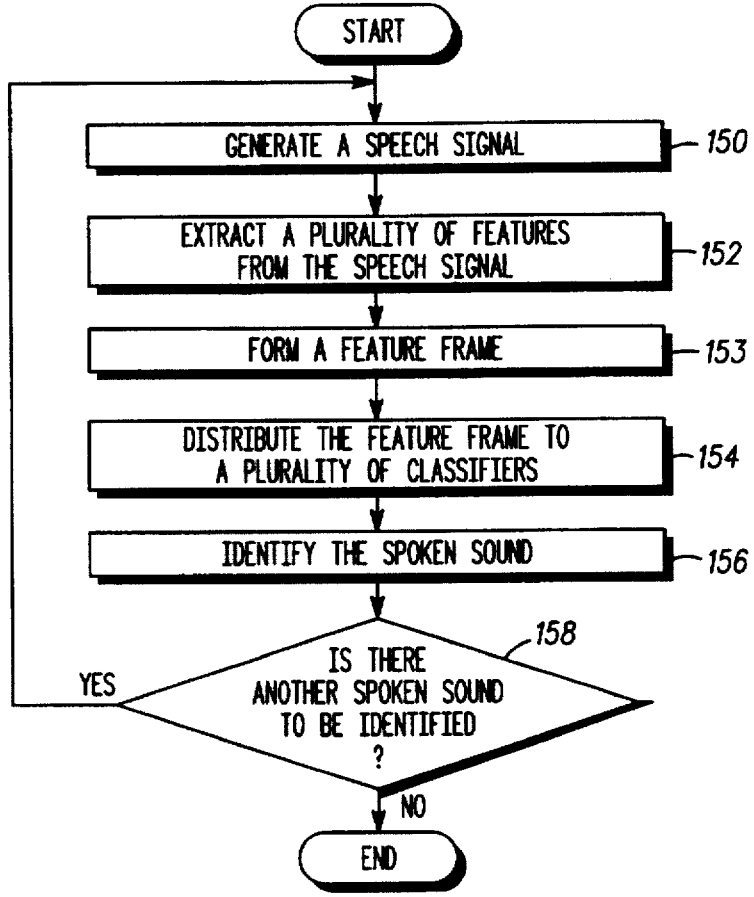
FIG. 5 shows a flow diagram of a method of recognizing a spoken sound from continuous speech in accordance with a preferred embodiment of the present invention.

FIG. 5 shows a flow diagram of a method of recognizing a spoken sound from continuous speech in accordance with a preferred embodiment of the present invention. In box 150, a speech signal is generated from continuously spoken speech.

Next, in box 152, a plurality of features are extracted from the speech signal. The features correspond to the continuously spoken speech over an interval of time. In a preferred embodiment of the present invention, the extracted feature are cepstral coefficients.

In box 153, a feature frame is formed which comprises the extracted features. The feature frame may include one or more digital words which represent the extracted features.

In box 154, the feature frame is distributed to a plurality of classifiers. Each of the classifiers implements a discriminant function which is tuned to indicate a different spoken sound. In response to receiving the feature frame, each classifier generates a classifier output signal which represents the result of computing the discriminant function.

In box 156, the identity of the spoken sound is determined by comparing the classifier output signals from the classifiers. In one embodiment of the present invention, the classifier output signal with the largest magnitude indicates the identity of the spoken sound.

In decision box 158, a check is made to determine if there is another spoken sound to be recognized from the continuously spoken speech. If there is another spoken sound, the method returns to box 150. If not, the method terminates.

SUMMARY

There has been described herein a concept, as well as several embodiments including a preferred embodiment, of a both a method and system for recognizing spoken sounds from continuous speech.

Because the various embodiments of the present invention herein described utilize a plurality of classifiers they are insensitive to differences in speakers and not adversely affected by background noise.

It will also be appreciated that the various embodiments of the speech-recognition system as described herein do not require repetitive training; thus, the embodiments of the present invention require substantially less training time and are significantly more accurate than known speech-recognition systems.

Furthermore, it will be apparent to those skilled in the art that the disclosed invention may be modified in numerous ways and may assume many embodiments other than the preferred form specifically set out and described above.

It will be understood that the concept of the present invention can vary in many ways. For example, it is a matter of design choice regarding such system structural elements as the number of classifiers, or the number of inputs to the selector. It is a matter of design choice whether the present invention is implemented in hardware or software. Such design choices greatly depend upon the integrated circuit technology, type of implementation (e.g. analog, digital, software, etc.), die sizes, pin-outs, and so on.

Accordingly, it is intended by the appended claims to cover all modifications of the invention which fall within the true spirit and scope of the invention.

What is claimed is:

1. A method of recognizing a spoken sound from continuously spoken speech, the continuously spoken speech including a plurality of spoken sounds, the method comprising the steps of:
   (a) extracting at least one feature from an interval of the continuously spoken speech;
   (b) distributing the at least one feature to a plurality of classifiers, each of the classifiers generating a classifier output signal as a function of a polynomial expansion that includes the at least one feature as an independent variable, whereby producing a plurality of classifier output signals; and
   (c) identifying the spoken sound by comparing the plurality of classifier output signals to one another in order to determine which of the plurality of classifier output signals has a largest magnitude.

2. The method of claim 1, wherein each of the plurality of classifiers implements a respective polynomial expansion comprising a plurality of coefficients which have been adjusted during a prior training phase to classifiy a respective one of the spoken sounds.

3. The method of claim 1 wherein the at least one feature is selected from a group consisting of cepstral coefficients, predictive coefficients, and Fourier coefficients.

4. The method of claim 1, wherein the polynomial expansion has the form:

$$y = \sum_{i=1}^{m} w_{i-1} x_1^{g_{1i}} x_2^{g_{2i}} \ldots x_n^{g_{ni}}$$

wherein y represents the classifier output signal;
wherein i, m, and n are integers;
wherein $w_{i-1}$ represents the coefficient for the ith term;
wherein $x_1, x_2, \ldots, x_n$ represent one or more independent variables; and
wherein $g_{1i}, \ldots, g_{ni}$ represent the exponents for the ith term in the expansion which are applied to the one or more independent variables.

5. The method of claim 1, wherein steps (a)–(c) are repeated for a sequence of intervals of time to identify a sequence of spoken sounds from the continuously spoken speech.

6. The method of claim 5 wherein each interval of time has a duration of 10 milliseconds.

7. The method of claim 1 wherein the spoken sound is a word, character, or phoneme.

8. The method of claim 1 wherein the method is implemented by a computer program.

9. A system for recognizing a spoken sound from continuously spoken speech having a plurality of spoken sounds, the system comprising:
   a plurality of classifiers for generating a plurality of classifier output signals, each of the classifiers receiving at least one feature extracted from an interval of the continuously spoken speech and generating a classifier output signal as a function of a polynomial expansion that includes the at least one feature as an independent variable; and
   a selector for identifying the spoken sound by comparing the plurality of classifier output signals to one another in order to determine which of the plurality of classifier output signals has a largest magnitude.

10. The system recited in claim 9 further comprising:
    a converter which receives the continuously spoken speech and generates a speech signal from the continuously spoken speech;
    a feature extractor for extracting the at least one feature from the speech signal; and
    a means for distributing the at least one feature to the plurality of classifiers.

11. The system of claim 9, wherein the at least one feature is selected from a group consisting of cepstral coefficients, predictive coefficients, and Fourier coefficients.

12. The system of claim 9, wherein each of the plurality of classifiers implements a respective polynomial expansion comprising a plurality of coefficients which have been adjusted during a prior training phase to classifiy a respective one of the spoken sounds.

13. The system of claim 9, wherein the polynomial expansion has the form:

$$y = \sum_{i=1}^{m} w_{i-1} x_1^{g_{1i}} x_2^{g_{2i}} \ldots x_n^{g_{ni}}$$

wherein y represents the classifier output signal;
wherein i, m, and n are integers;
wherein $w_{i-1}$ represents the coefficient for the ith term;
wherein $x_1, x_2, \ldots, x_n$ represent one or more independent variables; and
wherein $g_{1i}, \ldots, g_{ni}$ represent the exponents for the ith term in the expansion which are applied to the one or more independent variables.

14. The system of claim 9 wherein the spoken sound is a word, character, or phoneme.

15. The system of claim 9 wherein the system is implemented in a computer program.

16. The system of claim 9 wherein the plurality of classifiers and the selector are implemented using at least one integrated circuit.

17. The system of claim 9 wherein the selector identifies a spoken sound corresponding to a sequence of intervals of time.

18. The system of claim 17 wherein each of the intervals of time has a duration of 10 milliseconds.

19. A method of recognizing a spoken sound from continuously spoken speech, the continuously spoken speech including a plurality of spoken sounds, the method comprising the steps of:

(a) extracting at least one feature from an interval of the continuously spoken speech;

(b) distributing the at least one feature to a plurality of classifiers, each of the classifiers generating a classifier output signal based on a polynomial expansion having a form $$y = \sum_{i=1}^{m} w_{i-1} x_1^{g_{1i}} x_2^{g_{2i}} \ldots x_n^{g_{ni}}$$

wherein y represents the classifier output signal, $w_{i-1}$ represents a coefficient for the ith term, i, m, and n are integers, $x_1, x_2, \ldots, x_n$ represent the at least one feature, and $g_{1i}, \ldots, g_{ni}$ represent the exponents for the ith term in the expansion, whereby the plurality of classifiers produce a plurality of classifier output signals; and (c) identifying the spoken sound by comparing the plurality of classifier output signals to one another in order to determine which of the plurality of classifier output signals has a largest magnitude.

20. The method of claim 19, wherein at least one term of said polynomial expansion includes at least two indepent variables corresponding to non-zero exponents and representing different dimensions in a feature space.

21. The method of claim 19, wherein each of the plurality of classifiers implements a respective polynomial expansion comprising a plurality of coefficients which have been adjusted during a prior training phase to classifiy a respective one of the spoken sounds.

22. The method of claim 19, wherein the at least one feature is selected from a group consisting of cepstral coefficients, predictive coefficients, and Fourier coefficients.

* * * * *